March 27, 1956 W. A. TAYLOR 2,739,549
AGRICULTURAL IMPLEMENT
Filed Aug. 24, 1950 6 Sheets-Sheet 1
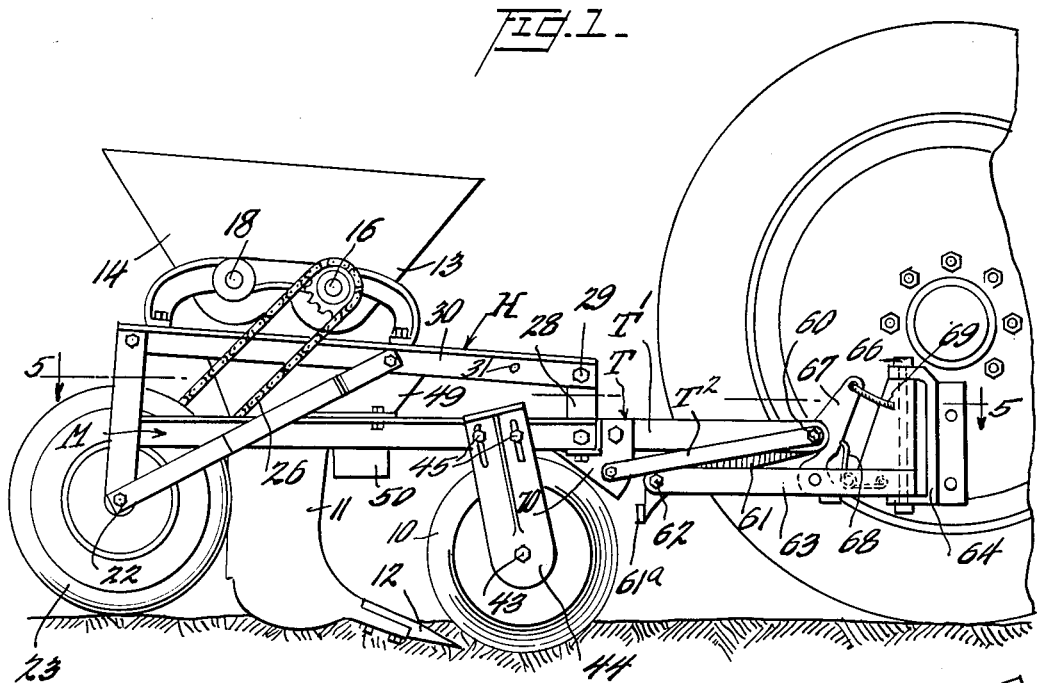
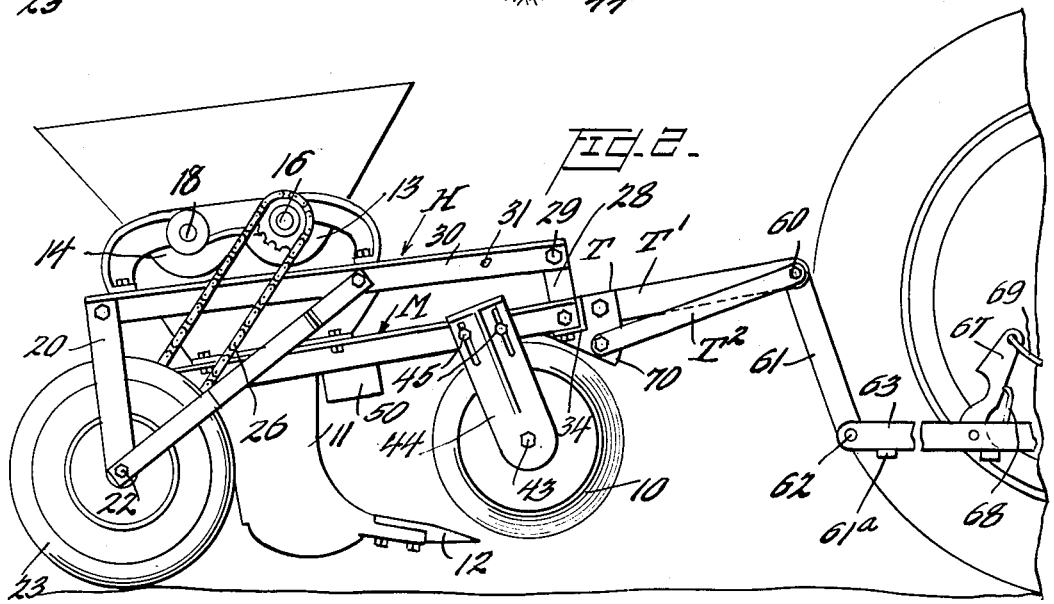
INVENTOR.
William A. Taylor
BY Watson, Cole, Grindle
& Watson
Attorneys

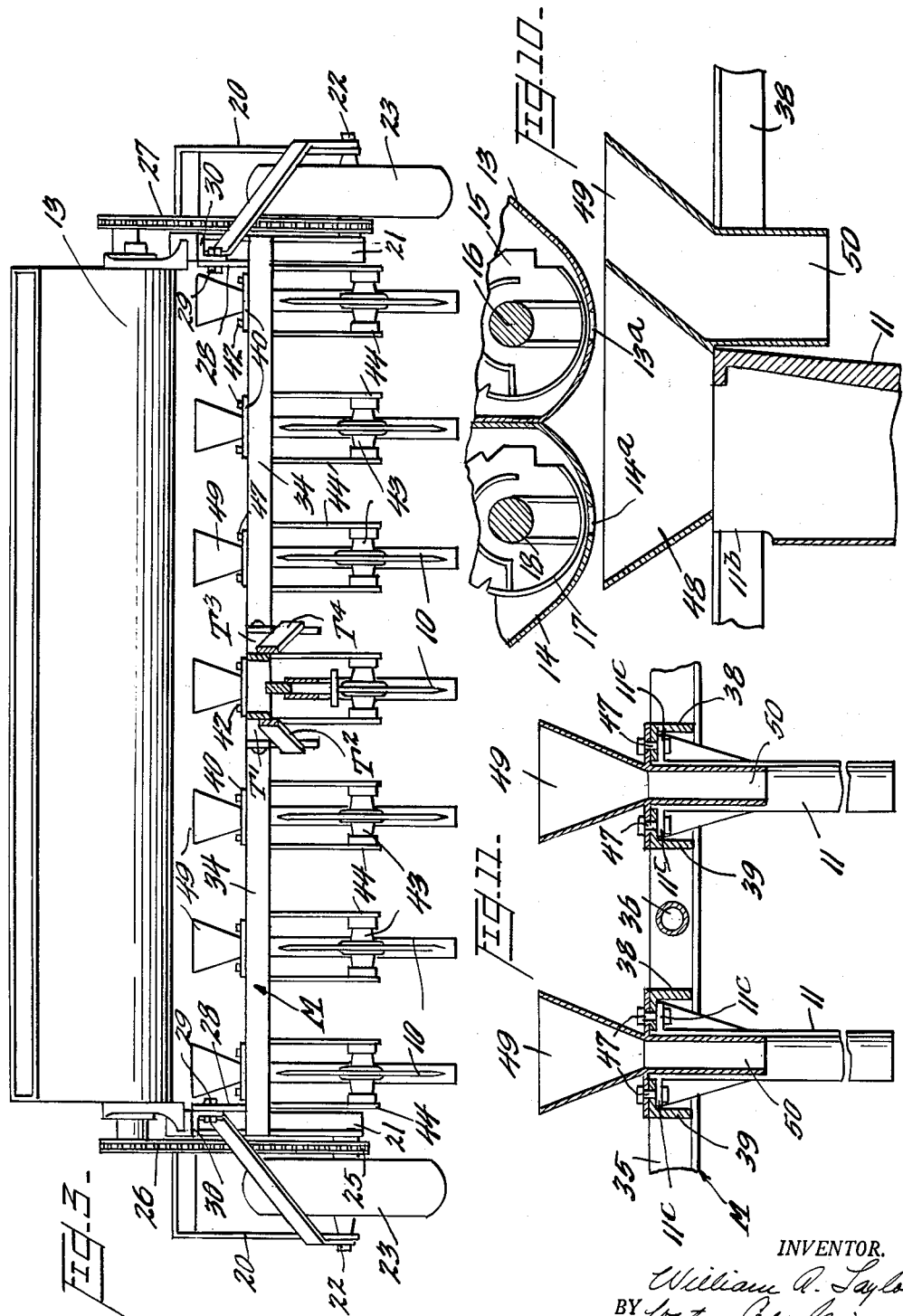

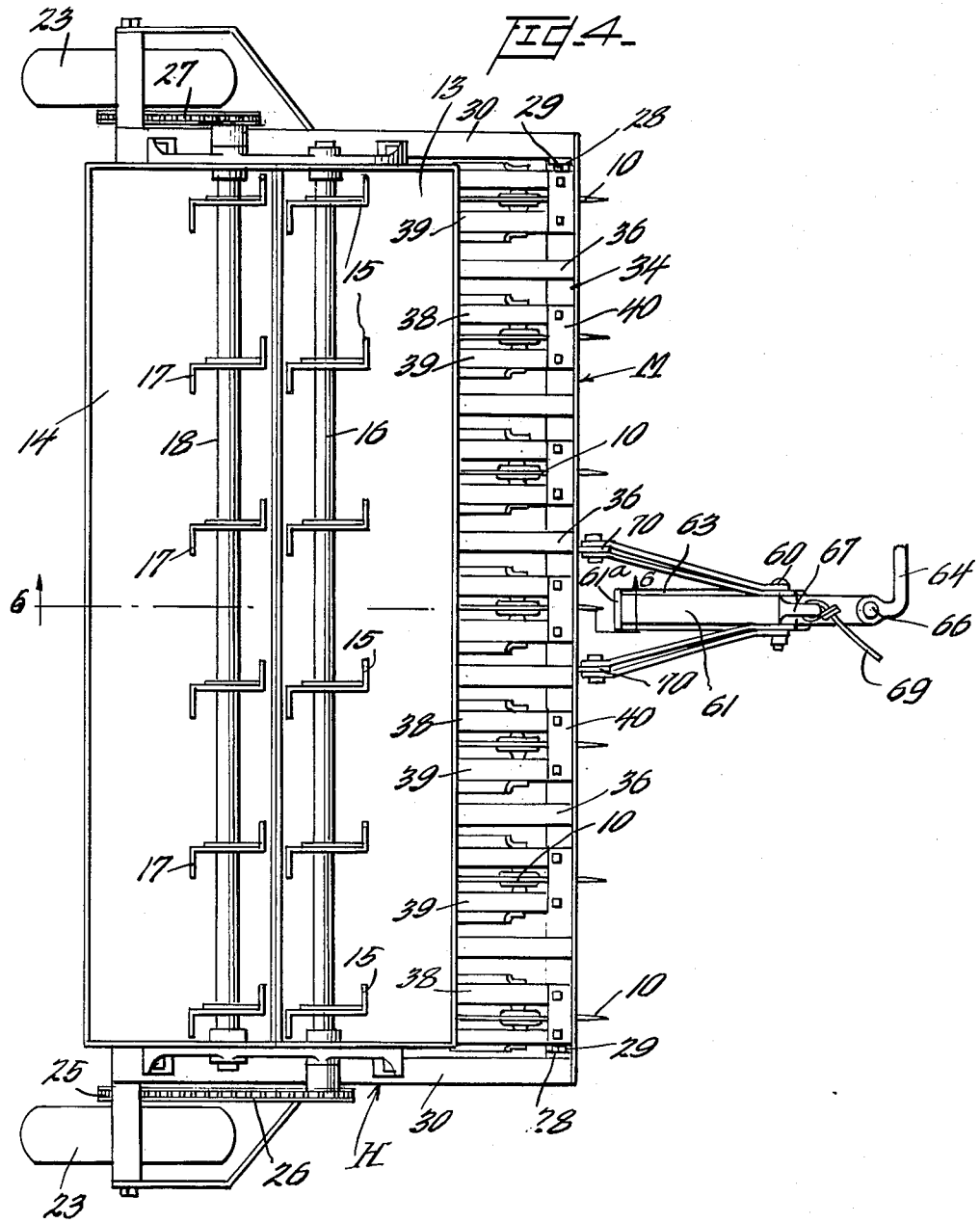

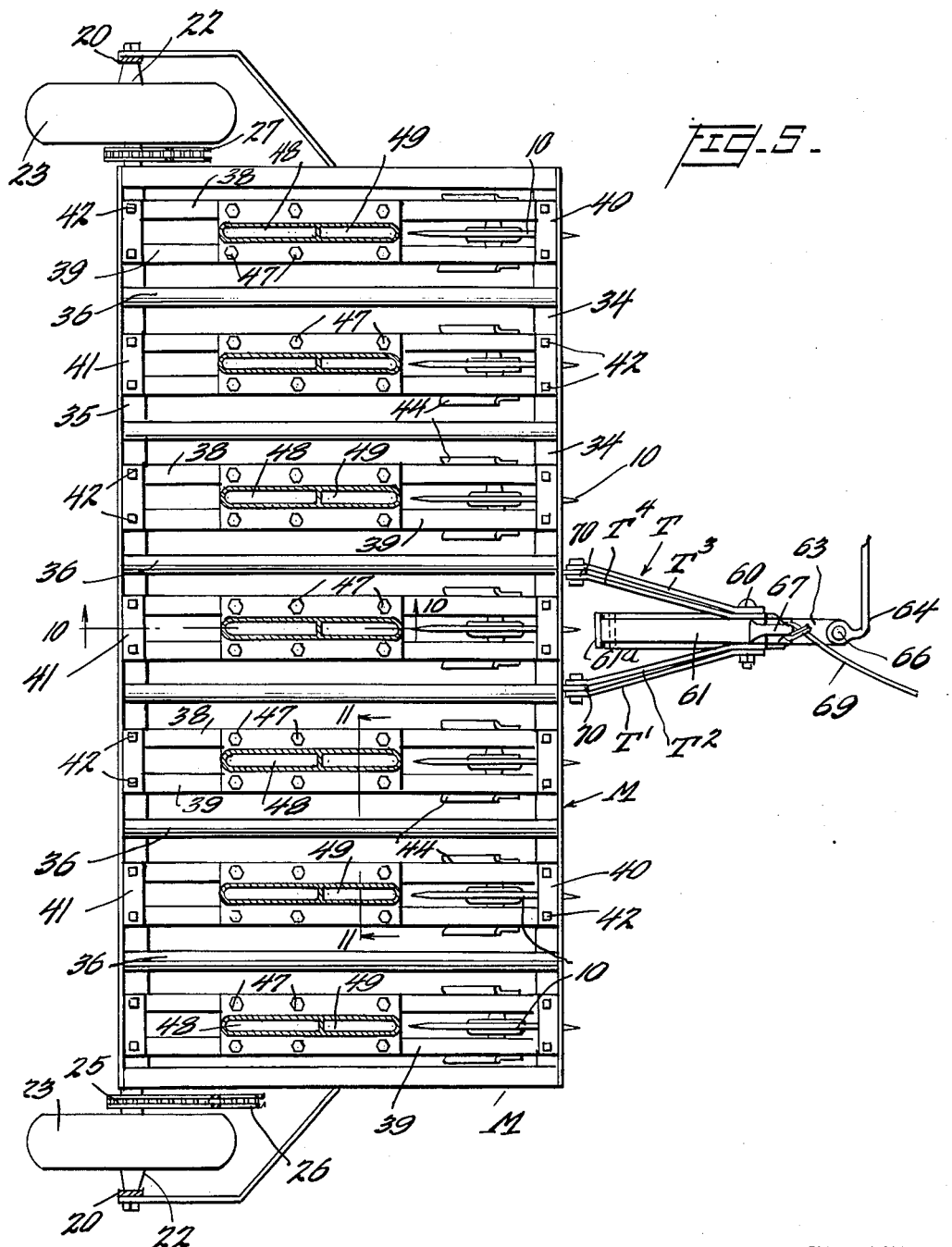

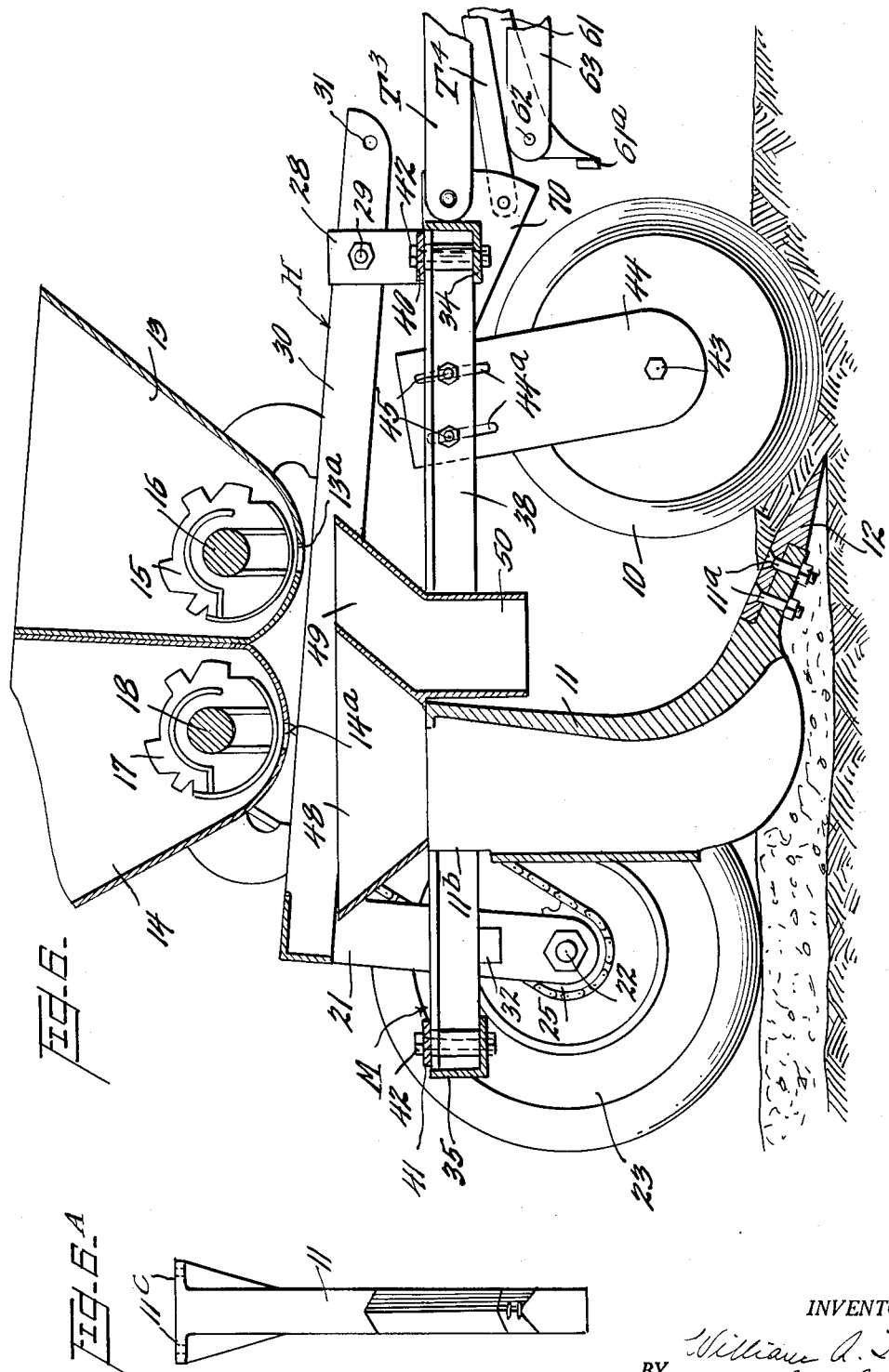

March 27, 1956
W. A. TAYLOR
2,739,549
AGRICULTURAL IMPLEMENT
Filed Aug. 24, 1950
6 Sheets-Sheet 6
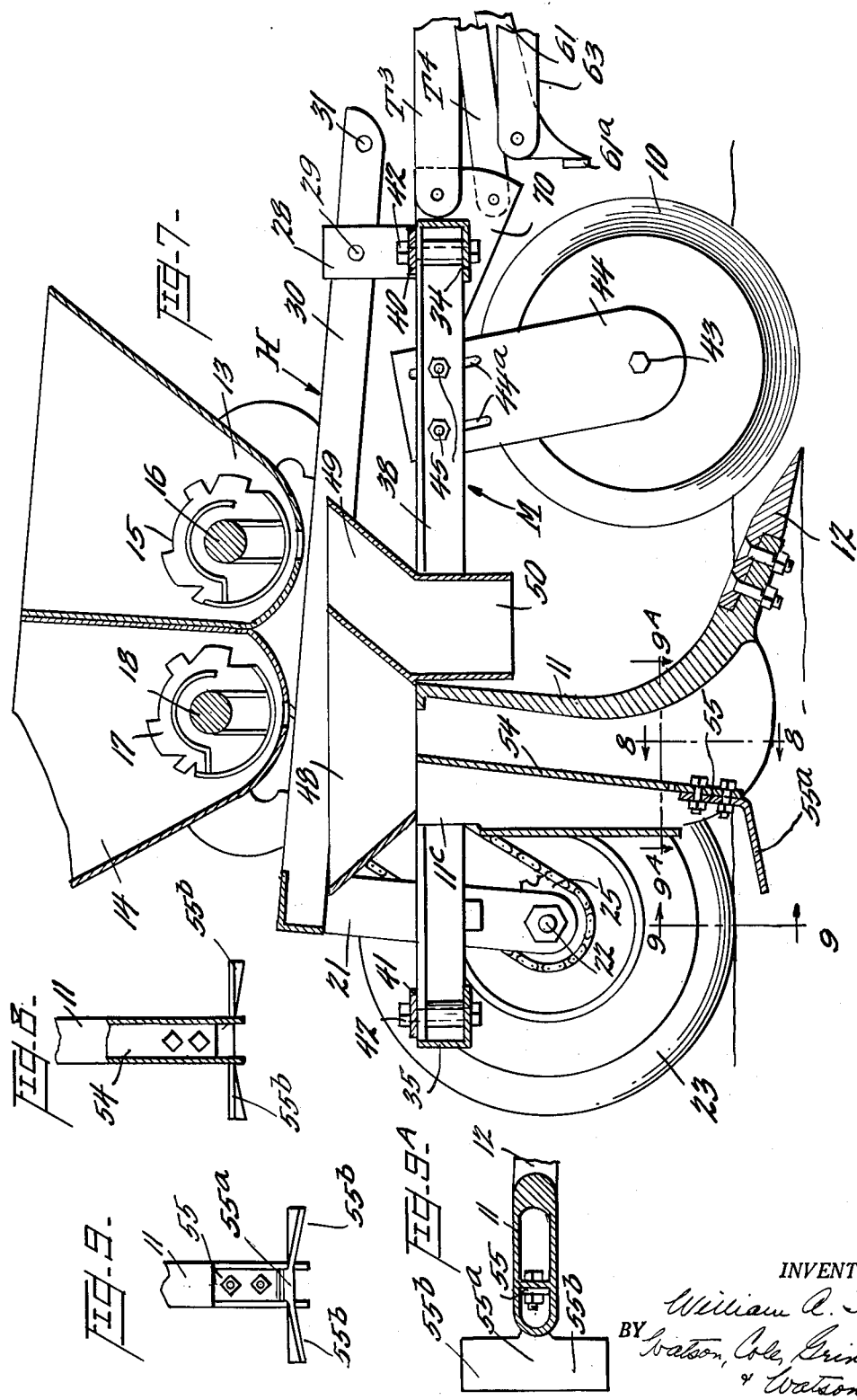
INVENTOR.
William A. Taylor
BY Watson, Cole, Grindle
& Watson
Attorneys United States Patent Office 2,739,549
Patented Mar. 27, 1956

2,739,549

AGRICULTURAL IMPLEMENT

William A. Taylor, Louisville, Miss., assignor to Taylor Machine Works, Louisville, Miss., a corporation of Mississippi Application August 24, 1950, Serial No. 181,291

1 Claim. (Cl. 111—9)

This invention relates to agricultural implements and particularly to implements designed and intended for use in the cultivation and fertilization of pasture lands.

The object of the present invention is to provide an agricultural implement having furrow-forming boots and material discharging hoppers adjustably related to said boots so as to be positioned to discharge into said boots or with one hopper discharging into said boots and the other hopper discharging in advance of the boots.

One embodiment of the invention will be disclosed in detail by way of example but it will be understood by one skilled in the art that, in adapting the invention to peculiar local conditions of soil and terrain, minor changes and adjustments of the parts may be made to increase the efficiency of the implement in accomplishing its functions. The implement selected for disclosure is illustrated in the accompanying drawings in which:

Figure 1 illustrates the implement in side elevation, a portion of the rear end of a conventional tractor being likewise illustrated, together with a part of the novel draft means;

Figure 2 is a similar view showing the implement in an inoperative position, this being the position which it assumes when it is being transported from place to place, as when the tractor is turning at the end of one seeding and fertilizing movement over a pasture and is preparing for a fresh operation;

Figure 3 is a view of the implement as seen in front elevation;

Figure 4 is a top plan view of the implement;

Figure 5 is a section on line 5—5 of Figure 1;

Figure 6 is a section in large scale taken on line 6—6 of Figure 4;

Figure 6A shows one of the boots as seen in front elevation;

Figure 7 is a sectional view similar to Figure 6 showing, however, a somewhat modified form of boot, means being provided for the deposition of fertilizer and seeds in two different levels, the fertilizer being covered with earth prior to the deposition of the seed;

Figure 8 is a section on line 8—8 of Figure 7;

Figure 9 is a section on line 9—9 of Figure 7;

Figure 9A is a section on line 9A—9A of Figure 7;

Figure 10 is a section in large scale taken on line 10—10 of Figure 5; and

Figure 11 is a section in large scale taken on line 11—11 of Figure 5.

Each of the furrow forming and opening means comprises a rolling coulter or disk 10 with sharpened edge and a boot generally indicated at 11, to the lower forward portion of which is rigidly attached in any suitable manner, as by bolts 11a, an incisor 12. The incisor has a horizontally disposed leading edge, relatively long as compared with the width of the coulter, its upper surface immediately in rear of that edge being flat so as to comprise an upwardly inclined earth lifting or wedging surface. In rear of the flat surface the upper surface is centrally elevated, to form a ridge, as shown. Each coulter 10 immediately precedes a boot 11 and all of the coulters and boots are mounted upon a main frame generally indicated at M. A second frame, generally indicated at H, is disposed above the main frame M, this second frame carrying two hoppers disposed side by side and extending transversely of the direction of movement of the machine, from one end of the machine to the other, the forward hopper being indicated at 13 and the rear hopper at 14, each hopper having an aperture in its bottom for the discharge of material and embodying a material stirring means for causing material to flow at a predetermined rate through such aperture so long as the implement is in motion, the aperture in hopper 13 being indicated at 13a and one of the agitating elements at 15. The agitating elements 15 are mounted upon a rotatable shaft 16, and the agitating elements 17 are fixed upon a rotatably mounted shaft 18. The discharge aperture of hopper 14 is indicated at 14a.

The rear end of the hopper frame is provided with a wheeled support, having downwardly extending leg members 20 and 21 the lower ends of which receive and support, respectively, the ends of a horizontal axle generally indicated at 22 upon which the wheels 23, preferably equipped with pneumatic tires, are mounted. It will be understood that the wheeled supports at the two ends of the hopper frame H are identical in construction. Each wheel has associated with it in fixed relation thereto a sprocket, one of which is indicated at 25 in Figure 6, and sprocket 25 is operatively connected by a chain 26 with shaft 16, whereby that shaft is driven when the associated wheel revolves during the forward motion of the implement. Shaft 18 is similarly driven from the other wheel through a connecting chain 27.

At its forward end the hopper frame H is pivotally connected to the main frame M, the main frame having upstanding brackets at its corners, indicated at 28, and aligned bolts 29 passing through the end structural elements of the hopper frame and suitable apertures in the brackets 28 so that the hopper frame and main frame are angularly adjustable about the common axis of the aligned bolts 29, which is a horizontal axis. The longitudinal structural elements 30 of the hopper frame are provided with transversely aligned apertures 31 for the bolts 29 and a second set of such aligned apertures spaced therefrom, may also be brought into alignment with the apertures in the brackets 28 on the main frame by shifting the hopper frame after removal of bolts 29, the hopper frame being, therefore, longitudinally adjustable with respect to the main frame for a purpose hereinafter to be made clear.

Each of the legs 21 of the hopper frame carries a stop 32 which may be vertically adjustable. Each such stop projects inwardly and underlies a portion of the main frame M. Downward movement of the rear end of the main frame, with respect to the hopper frame, is, therefore, limited by means of these stops and the depth of penetration of the incisor 12 and coulter 10 thus determined while, at the same time, the coulter, incisor and boot, together with the main frame, may move upwardly relatively to the hopper frame when the coulter strikes rock or an unusually resistant mass of any kind, thus avoiding injury to the implement. It may thus be said that the implement comprises essentially a main frame and a hopper frame, pivotally connected together at their forward ends for rocking movement about a horizontal axis, the hopper frame being provided with a ground engaging supporting means at its rear end, the rear end of the main frame being supported by the wheeled hopper frame when the implement is in motion.

The details of the frame may be varied substantially without departure from the invention and the hoppers 13 and 14 are of conventional type. The main frame may conveniently be rectangular in form with elongated parallel forward and rear structural members, preferably angles 34 and 35, these members being rigidly connected by spaced parallel tubular elements 36 extending fore and aft of the implement and the ends thereof being preferably welded to the vertical webs of the angle members 34 and 35. Upon the main frame are detachably mounted a series of supports for the furrow forming, fertilizing and seeding units, each such unit including a coulter 10 and a boot 11 with its incisor 12. Thus in Figure 5 of the drawings seven such unit supporting means may be observed. Each of these supporting means includes two parallel structural elements 38 and 39, preferably angle irons, with the major webs thereof vertically disposed and the horizontal webs in a common plane. The two structural elements of each boot supporting element are in turn welded, at their ends, and rest upon rectangular plates 40 and 41, the outer margins of which overlie the horizontal flanges of structural elements 34 and 35 of the main frame, respectively, and are detachably secured in the positions in which they are shown in Figure 5 by suitable bolts 42. The coulter 10 of each unit is provided with an axle 43 which is rotatably received within bearings formed in the lower end of parallel bracket members 44, these members being provided with parallel slots 44a through which the securing bolts 45 project, this connection thus making it possible for the operator to adjust each coulter 10 angularly in a fore and aft direction and also vertically in order to bring about the best working relationship of coulter and incisor. The incisor, extending forward at an angle slightly downward, enters the ground upon initiation of forward motion of the implement, and is impelled to operating depth by the wedging action of its design. The incisor penetrates deeper than the rolling coulter, and in turn pulls the coulter into the surface above the incisor. The dual action of the incisor, pulling itself into the soil and compressing the soil above between it and the coulter, causes the coulter to bisect the soil above the horizontal path of the incisor. In average soil the incisor travels at a depth of about three-quarters of an inch below the coulter blade. This depth is subject to adjustment by moving the coulter up or down and also backward or forward. In hard soil the incisor is adjusted to travel up to 1½ inches below the cutting line of the coulter, but in soft and wet soil the coulter is moved slightly forward and lowered to a point within ½ inch of the cutting depth of the incisor. These variables are necessary in order to get consistent results under different soil conditions. Each boot 11 is provided with lateral flanges 11c at its upper end and bolts 47 passing upwardly through suitable apertures formed in these flanges also pass through apertures formed in the horizontal webs of the parallel angle members 38 and 39, the boot thus being detachably secured to the angle members.

As may best be seen from an inspection of Figures 3, 6 and 6A, each boot comprises essentially a vertically disposed hollow tubular member, preferably formed by casting, being relatively narrow in transverse dimension and elongated in the direction of movement of the implement, the leading edge of the boot being shaped so as to form a furrow opening member, wedging aside the two freshly severed sections of sod between which the coulter has passed, and the upper surface of the incisor 12, in rear of the flat portion immediately adjacent the coulter, being likewise formed with a sod parting edge to facilitate the opening of the furrow. The curved rear wall of the boot is cut away at 11b so that one walking in the rear of the implement may observe the fall of materials and the bottom of the vertical passage through the boot is completely open, as may best be seen in Figure 6, so that seed and fertilizer dropped into its upper end will fall directly into the open furrow below.

Associated with each boot is a funnel member having two funnel shaped portions, a major portion indicated at 48 and a smaller funnel portion 49. These funnels are formed of light sheet metal and laterally extending flanges at the lower end of each major funnel portion 48 overlie the horizontal webs of angle irons 38 and 39, respectively, and are detachably retained in the positions in which they are shown (Figure 11) by the bolts 47 previously referred to. When the hopper frame H is in its rear position of adjustment, as shown in Figure 1, both hopper openings 13a and 14a are positioned above the major funnel opening 48. Hence, materials, which may be fertilizer and seed respectively, discharged from these ports, will pass into funnel 48 and thence downwardly together through the vertical passage in the boot below. When, however, the hopper frame H is in its forward position, in which position it is illustrated in Figure 6, the discharge aperture 13a of the forward funnel which, in this event, will contain fertilizer, is above the upper end of the funnel portion 49, which has at its lower end a vertically disposed depending tubular portion 50 (Figure 6).

Fertilizer descending through the minor funnel and the tubular extension 50 thereof will fall upon the leading edge of the boot 11 and, after entering the furrow, will be wiped by the leading edge of the boot against the faces of the parted strips of sod, a fertilizer disposition found to be very effective under some circumstances. When it is desired, however, that the fertilizer and seed be simultaneously discharged through the material conduit provided by the boot 11 the hopper frame will be moved to its rear position of adjustment.

Under some circumstances it may be desired to provide the boot with means for causing the fertilizer to be deposited in one stratum, as for instance at the bottom of the furrow formed by the coulter and incisor, the fertilizer to be then covered with earth, and the seed to be deposited upon the earth covering layer so that there is no direct contact between seed and fertilizer. This may be accomplished with the aid of the modified form of boot shown in Figures 7, 8, 9 and 9A of the drawings. The materials passage of the boot may be divided into two portions by means of a substantially vertical partition 54 having a fixture 55 adjustably secured to its lower end. Fixture 55 has a rearwardly and downwardly directed web 55a and laterally extending integral blade like portions 55b. The leading edge of each such blade is horizontally disposed and constitutes a cutting edge and the trailing edge is downwardly and outwardly inclined as shown in Figure 9, the intermediate portion being warped. With such an attachment in position fertilizer will descend through the leading duct of the boot and will fall directly upon the bottom of the slot or furrow which has been formed by the coulter and incisor, the lower end of the boot having shaped the incised sections of sod as heretofore explained so that fertilizer may freely fall to the furrow bottom. Seed falling through the second or rearmost duct of the boot will, however, be deflected rearwardly by the deflecting web 55a.

By reason of the fact that the blades 55b described have caused the fertilizer reaching the bottom of the furrow to be covered with earth immediately after it reaches final position, the seed falling through the second duct will be deposited upon the top of the fertilizer covering earth and will not make direct contact with the fertilizer. It is quite possible, with the use of an attachment of the character described, to deposit upon the bottom of a furrow a substantial amount of fertilizer while at the same time protecting the seed during its germination period from the direct action of such fertilizer.

In moving across a pasture each coulter and boot unit will form therein, as previously explained, a vertical incision or slot and this vertical slot is immediately extended and formed into a furrow by the horizontal leading edge of the incisor 12 and forward edge of the boot proper. The relationship of the coulter and incisor are such that the functioning of the coulter is improved, the substantially flat surface of the incisor which faces the coulter edge serving to wedge the coulter downwardly into the sod or turf. Suitable adjustments of the coulter on the main frame may be made to insure maximum cooperative effectiveness of coulter and invisor. It will also be appreciated that, in adapting the invention to the improvement of various types of pasture lands various adjustments and minor changes may be made.

The draft means or hitch which connects the implement to the tractor which pulls it is of simple character. A tongue generally indicated at T projects forwardly of the main frame M of the implement, this tongue carrying at its forward end a short transverse pivot 60 upon which is rotatably mounted one end of a link 61. The opposite end of link 61 is pivotally mounted at 62 upon one end of a generally horizontal member 63 mounted for swinging movement in a horizontal plane, the enlarged forward end of member 63 being pivotally connected to a bracket 64 rigidly secured to the tractor frame in any suitable manner, as by a vertically disposed pivot pin 66. Link 61 is provided with a foot or stop 61a which is adapted to limit the angular movement of link 61 about pivot 62 by striking the underside of member 63, as shown in Figure 2, and there is pivotally mounted on member 63 a latch 67, normally urged by spring 68 to the position in which it is shown in Figure 2, a cord or link 69 extending forwardly from the latch to a point where it may be conveniently grasped by the operator of the tractor.

When the parts of the hitch occupy the relative positions in which they are shown in Figures 1 and 4 the latch 67 operatively engages the pivot 60 and the tongue T, link 61 and member 63 are locked together to form one rigid draft transmitting structure. When the tractor advances furrows will be formed as described and the hitch will prevent penetration of the coulter and incisor into the ground to a greater than predetermined extent, due to its rigidity, but will not prevent the main frame from rising when the coulter encounters a rock, the main frame and tongue swinging about the axis of pivot 60.

When it is desired to render the implement inoperative, as when it is to be turned, or lifted for transportation over a roadway, the operator will release the latch 67 by pulling cord 69. When this happens the link 61 will swing from the position in which it is shown in Figure 1 to the position in which it is shown in Figure 2, the stop 61a contacting member 63 and bringing the swinging movement of the link to a stop. As link 61 swings the front end of the implement is elevated and the soil working elements lifted to positions well above the ground level. If the motion of the tractor continues the impleemnt will be drawn forwardly while thus elevated and, if the tractor turns, the implement and hitch will pivot about pin 66. The tongue T, link 61 and member 63 may be variously formed. Conveniently the tongue T may include four linklike members T', T², T³ and T⁴ arranged in pairs, all of such members being rigidly connected by pin 60 at their forward ends. Members T' and T², upon one side, are angularly disposed and separately connected at their rear ends to a plate 70 rigidly secured to the main frame M. Members T³ and T⁴ are similarly arranged and secured, thus insuring rigidity of the tongue.

Having thus described the invention, what is claimed as new and desired to be secured by Letters Patent is:

In an agricultural implement of the type described, in combination, a main frame supported for movement over the ground, a plurality of hollow furrow-forming boots mounted on said frame in side-by-side relationship, each boot having a first funnel associated therewith and leading into said boot, said first funnel being of substantial fore-and-aft extent and carried by said main frame, a second funnel carried by said main frame in advance of each of said boots for conducting material downwardly to the surface of the ground independently of the boots, a hopper frame supported for movement over the ground and disposed above said main frame, a forward hopper and a rear hopper supported on said hopper frame and extending transversely thereof, each hopper having discharge openings in alignment with said funnels, and means pivotally connecting said hopper frame to said main frame in a plurality of positions each for movement about a horizontal axis whereby said hopper frame may be positioned so both of said hoppers discharge into said first funnels or may be positioned so said rear hopper discharges into said first funnels and said forward hopper discharges into said second funnels.

References Cited in the file of this patent

UNITED STATES PATENTS

| Number | Name | Date |
|---|---|---|
| 13,781 | Curtis | Nov. 13, 1855 |
| 40,770 | Rich | Dec. 1, 1863 |
| 78,846 | Wallace | June 9, 1868 |
| 250,512 | Evans et al. | Dec. 6, 1881 |
| 292,404 | Bradford | Jan. 22, 1884 |
| 331,588 | Walker et al. | Dec. 1, 1885 |
| 331,687 | Crane | Dec. 1, 1885 |
| 347,614 | Johnston | Aug. 17, 1886 |
| 464,124 | Thomas | Dec. 1, 1891 |
| 500,725 | Tyler | July 4, 1893 |
| 507,796 | Ferris | Oct. 31, 1893 |
| 556,671 | Griffith | Mar. 17, 1896 |
| 562,755 | Banwarth | June 23, 1896 |
| 566,549 | Thomas | Aug. 25, 1896 |
| 612,043 | King | Oct. 11, 1898 |
| 738,816 | Kindsvater | Sept. 15, 1903 |
| 798,875 | Cone | Sept. 5, 1905 |
| 993,183 | McGuire | May 23, 1911 |
| 1,263,111 | Reichelt | Apr. 16, 1918 |
| 1,282,798 | Fowler | Oct. 29, 1918 |
| 1,475,879 | Reynolds | Nov. 27, 1923 |
| 1,527,675 | Dunn et al. | Feb. 24, 1925 |
| 1,757,956 | Flatley et al. | May 13, 1930 |
| 1,829,745 | Grossi | Nov. 3, 1931 |
| 2,001,003 | Tuft | May 14, 1935 |
| 2,048,441 | Feltman | July 21, 1936 |
| 2,141,819 | Nelson | Dec. 27, 1938 |
| 2,159,652 | Brunner | May 23, 1939 |
| 2,260,110 | Blohm | Oct. 21, 1941 |
| 2,262,546 | Donoho et al. | Nov. 11, 1941 |
| 2,657,652 | Graham | Nov. 3, 1953 |

FOREIGN PATENTS

| Number | Country | Date |
|---|---|---|
| 260,239 | Switzerland | July 16, 1949 |
| 650,688 | Germany | Sept. 29, 1937 |

OTHER REFERENCES

Farm Implement News, vol. 70, No. 24, December 1, 1949, page 34.